(12) United States Patent
Lima et al.

(10) Patent No.: US 7,966,540 B1
(45) Date of Patent: Jun. 21, 2011

(54) TRANSMITTING ERROR CORRECTION INFORMATION (75) Inventors: Claudio R. Lima, San Jose, CA (US); Renxiang Huang, Sunnyvale, CA (US); James J. Pan, Cupertino, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 1082 days.

(21) Appl. No.: 11/743,435

(22) Filed: May 2, 2007

(51) Int. Cl.
*G08C 25/02* (2006.01)
(52) U.S. Cl. ........................................ 714/748; 370/347
(58) Field of Classification Search .................. 714/748; 370/347
See application file for complete search history.

(56) References Cited

U.S. PATENT DOCUMENTS

| | | | |
|---|---|---|---|
| 6,570,843 B1 | 5/2003 | Wolfgang | |
| 6,681,365 B1 | 1/2004 | Anand et al. | |
| 2005/0259584 A1* | 11/2005 | Chen et al. | 370/238 |
| 2006/0072538 A1 | 4/2006 | Raith | |
| 2006/0156198 A1 | 7/2006 | Boyce et al. | |
| 2006/0236153 A1 | 10/2006 | Aaltonen | |
| 2008/0159253 A1* | 7/2008 | Yamazaki et al. | 370/347 |

* cited by examiner

*Primary Examiner* — Sam Rizk (57) ABSTRACT

A method of operating a communication system to communicate with a plurality of wireless devices comprises determining a first shape for a first wireless signal to reach the plurality of wireless devices, transmitting the first wireless signal encoded with a first communication to the plurality of wireless devices, receiving an acknowledgment from a first device of the plurality of wireless devices indicating that the first device received and decoded the first communication, determining a second shape for a second wireless signal to reach a second device of the plurality of wireless devices, and transmitting the second wireless signal encoded with error correction information for the first communication to the second device of the plurality of wireless devices.

16 Claims, 6 Drawing Sheets

TRANSMITTING ERROR CORRECTION INFORMATION

BACKGROUND OF THE INVENTION

1. Field of the Invention

This invention relates to the field of communication systems, and more particularly, to transmitting error correction information.

2. Description of the Prior Art

Wireless communication services have become ubiquitous as communication technologies have advanced. Mobile broadcasting is one technology that has gained popularity amongst communication service providers. Mobile broadcasting provides communication services providers with an efficient mechanism to deliver content to wireless customers when many users request the same content.

Communication service providers face many challenges when broadcasting content to mobile customers. For example, the signal quality between a service provider and a customer can severely impact service quality. A low quality signal between a service provider and a customer can result in data loss, packet loss, jitter, and other service problems.

In some cases, content can be retransmitted if the original transmission contains errors. However, retransmitting data wastes bandwidth and other processing resources. In addition, it is very likely that if an original transmission has errors, any retransmission of data will also have errors.

In other cases, forward error correction is used to correct transmission errors caused by low signal quality. Typically, forward error correction involves sending content data and error correction information. The error correction information is processed at the receiving end to correct for transmission errors in the content. Forward error correction can be employed at either the link layer or the packet layer of a communication link.

Unfortunately, forward error correction schemes typically require intensive processing by mobile devices. Such processing draws on finite resources, such as the battery power or memory of a device. In addition, prior art forward error correction schemes require all devices receiving a broadcast to employ forward error correction, even though some devices may receive the broadcast content without errors. Such schemes waste device resources.

SUMMARY OF THE INVENTION

Embodiments of the invention solve the above problems and other problems by progressively transmitting error correction information to mobile devices depending upon whether or not each device requires the error correction information in order to successfully decode a broadcast communication. In addition, selective beam forming is utilized to direct each progressive transmission of error correction information to the devices that need the error correction information, rather than to every device that receives a broadcast.

In an advantage, a device that has successfully decoded a broadcast transmission need not monitor for or process further error correction information. That device can therefore selectively power down and save processing power or resources. In addition, other devices that do require additional error correction information can be reached by subsequent progressively shaped or beam formed wireless transmissions.

In an embodiment of the invention, a communication system determines a first shape for a first wireless signal to reach a plurality of wireless devices. The communication system transmits the first wireless signal encoded with a first communication to the plurality of wireless devices. The communication system then receives an acknowledgment from a first device of the plurality of wireless devices indicating that the first device received and decoded the first communication. The communication system determines a second shape for a second wireless signal to reach a second device of the plurality of wireless devices and transmits the second wireless signal encoded with error correction information for the first communication to the second device of the plurality of wireless devices.

BRIEF DESCRIPTION OF THE DRAWINGS

The same reference number represents the same element on all drawings.

DETAILED DESCRIPTION OF THE INVENTION

FIGS. 1-6 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
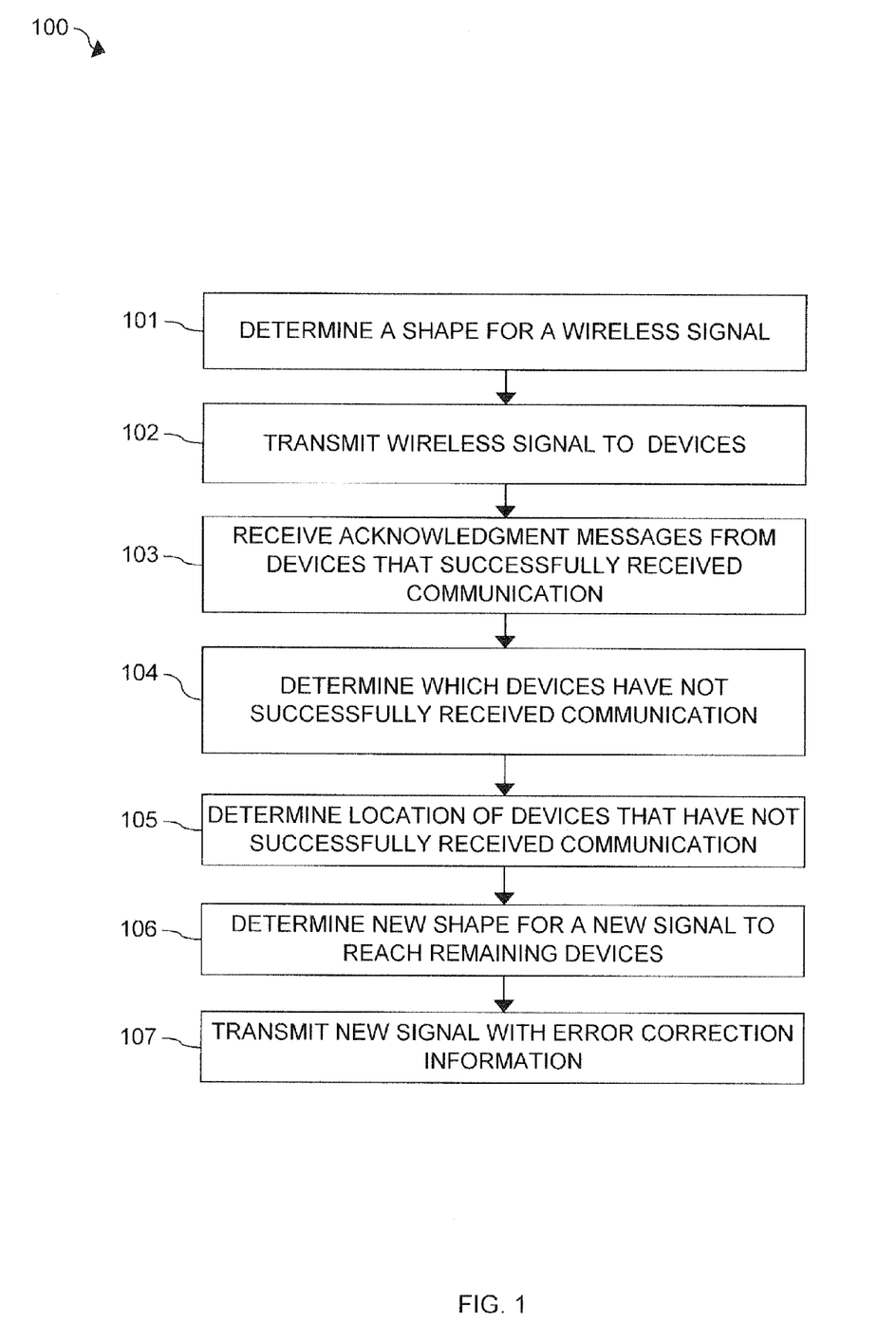
FIG. 1 illustrates a method in an embodiment of the invention.

FIG. 1 illustrates a method 100 in an embodiment of the invention. In method 100, a communication system determines a shape for an initial wireless signal for transmission to multiple mobile devices. (Step 101). The shape of the wireless signal could be such that the devices are located within the range or coverage area of the wireless signal. In general, the initial wireless signal could have an omni-directional shape.

After determining the shape of the wireless signal, the communication system transmits the initial wireless signal to the multiple devices within the range or coverage area of the shaped signal. (Step 102). The initial wireless signal is encoded with a communication, such as audio, video, or data communications for transmission over a wireless medium. The wireless signal could be transmitted in frames, packets, or any other well known transmission form or protocol. In an embodiment, the initial transmission of the communication is a broadcast communication.

After transmitting the initial wireless signal, the communication system monitors for and receives acknowledgement messages from the various devices of the multiple devices that successfully received and decoded the communication. (Step 103). The devices that successfully received and decoded the communication responsively transmit acknowledgments to the communication system. In some cases, some of the original devices may not have successfully decoded the communication. For example, the initial wireless signal may have been degraded due to physical obstructions, atmospheric interference, other radio frequency interference, or the like.

Upon receiving the acknowledgment messages, the communication system determines which devices of the multiple devices have not successfully received and/or decoded the communication. (Step 104). The communication system then determines the location of those devices that have not successfully received or decoded the communication. (Step 105). The communication system determines the location of the devices in a variety of ways, such as by use of the global positioning satellite system (GPS), triangulation techniques, or other well known location determination processes.

After determining the location of the devices that are yet to successfully decode the communication, the communication system determines a new shape for a new wireless signal that will reach at least some of the remaining devices of the original group of devices. (Step 106). Upon determining the new shape for the new wireless signal, the communication system generates and transmits the new wireless signal encoded with error correction information to the remaining devices over the new wireless signal. (Step 107). The error correction information is used by the remaining devices to decode the communication.

It should be understood that, of the remaining devices to which the error correction information is transmitted, only a subset may be able to successfully decode the communication using the error correction information. The subset that is successful in decoding the communication transmits acknowledgment messages to the communication system.

Even after shaping and generating the new wireless signal and transmitting the error correction information to the remaining devices, another subset of the remaining devices may still be unable to decode the communication. At this point, method 100 can be repeated from Step 103 through Step 107 as necessary for all the devices of the multiple devices to successfully decode the communication. For instance, the communication system could generate additional error correction information for use by the remaining devices to decode the communication. The additional error correction information could be in addition to the first error correction information.

In an embodiment, the error correction information and the additional error correction information could be progressive forward error correction codes. In combination with a smart beam forming antenna, each progressive layer of the progressive FEC codes could be delivered via a broadcast, multicast, or uni-cast transmission stage. In an embodiment, the error correction information could be packet-level error information used in a packet level forward error correction scheme. However, it should be understood that the error correction information could be encoded in physical layer, media access control layer, or internet protocol layers.

In an advantage, method 100 provides for progressively transmitting error correction information to only those devices that require any or additional error correction information in order to successfully decode a broadcast communication. In this manner, the devices that do not require the error correction information save power and battery life as they need not receive and process the error correction information. The progressive transmission of error correction information is accomplished by beam forming wireless transmissions so that the transmissions reach those devices that need the error correction information.

FIGS. 2-5 illustrate a wireless communication network 200 in another embodiment of the invention. Wireless communication network 200 includes communication system 210, device 211, device 212, device 213, device 214, and device 215, and communication network 205. Devices 211, 212, 213, 214, and 215 could be, for example, mobile phones, personal digital assistants, or personal computers, as well as other types of communication devices. Communication system 210 communicates wirelessly with devices 211, 212, 213, 214, and 215 to provide the devices with access to communication network 205. Communication system 210 could be, for example, a base transceiver station, a base station controller, a mobile switching center, or any combination thereof. Communication system 210 communicates with wireless with devices 211, 212, 213, 214, and 215 utilizing a wireless communication protocol, such as the code division multiple access (CDMA), wide band CDMA, CDMA2000, GSM WiMax, 1xRTT, or EVDO protocols. Other wireless protocols are possible.

Figure 3:
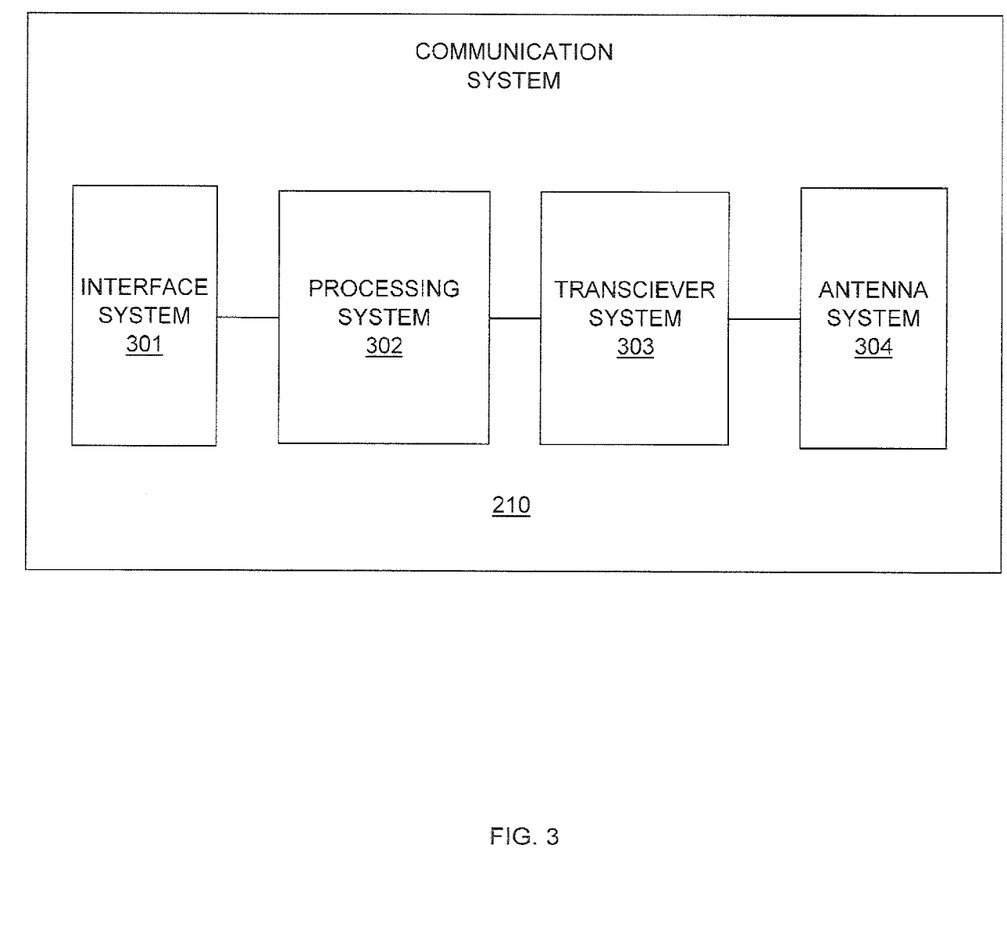
FIG. 3 illustrates a communication system in an embodiment of the invention.

Communication system 210 is further illustrated by FIG. 3. As shown, communication system 210 includes interface system 301, processing system 302, transceiver system 303, and antenna system 304. Interface system 301 is connected to processing system 302. Processing system 302 is connected to transceiver system 303. Transceiver system 303 is connected to antenna system 304. Interface system 301 interfaces communications between communication network 205 and processing system 302. Transceiver system 303 sends and receives wireless communications to devices 211, 212, 213, 214, and 215 via antenna system 304. Transceiver system 303 and antenna system 304 could be capable of beam forming or shaping wireless signals. Processing system 302 processes communications and controls interface system 301 and transceiver system 303 to operate communication system 210 as described herein.

Figure 2:
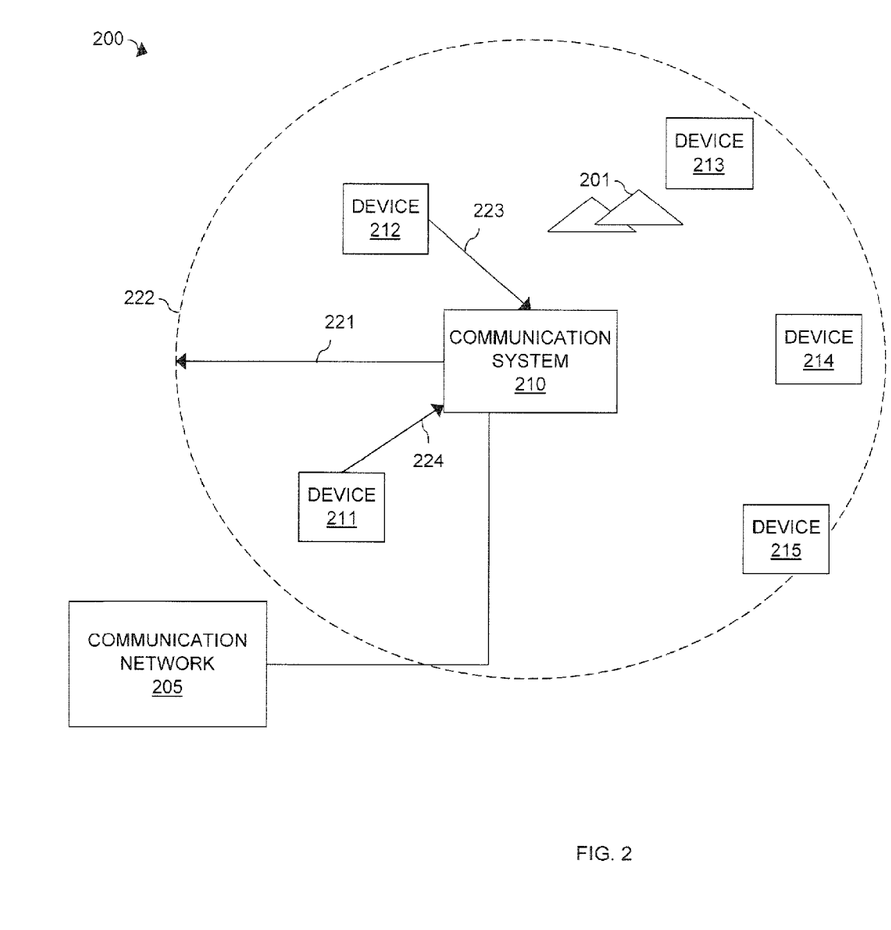
FIG. 2 illustrates a communication network in an embodiment of the invention.
Figure 4:
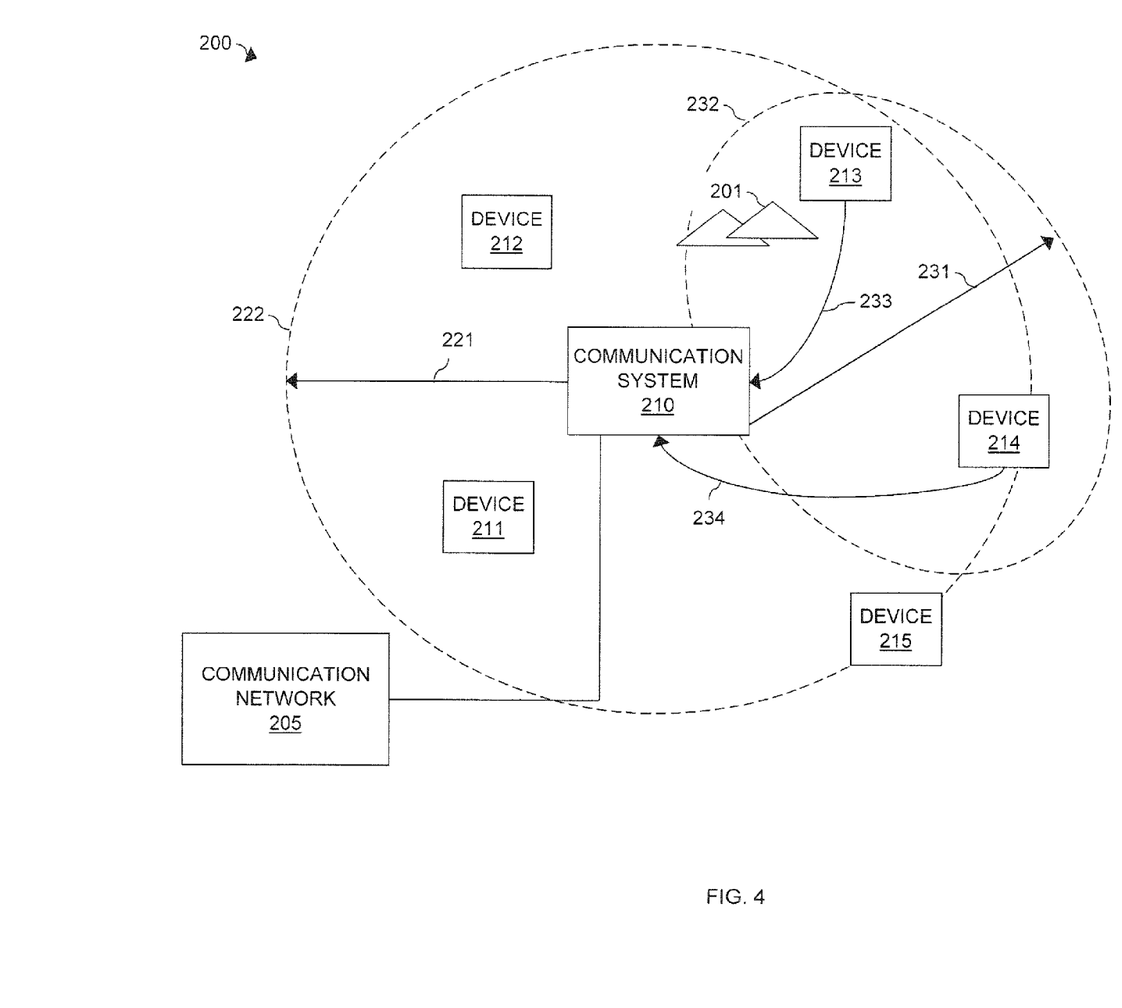
FIG. 4 illustrates a communication network in an embodiment of the invention.
Figure 5:
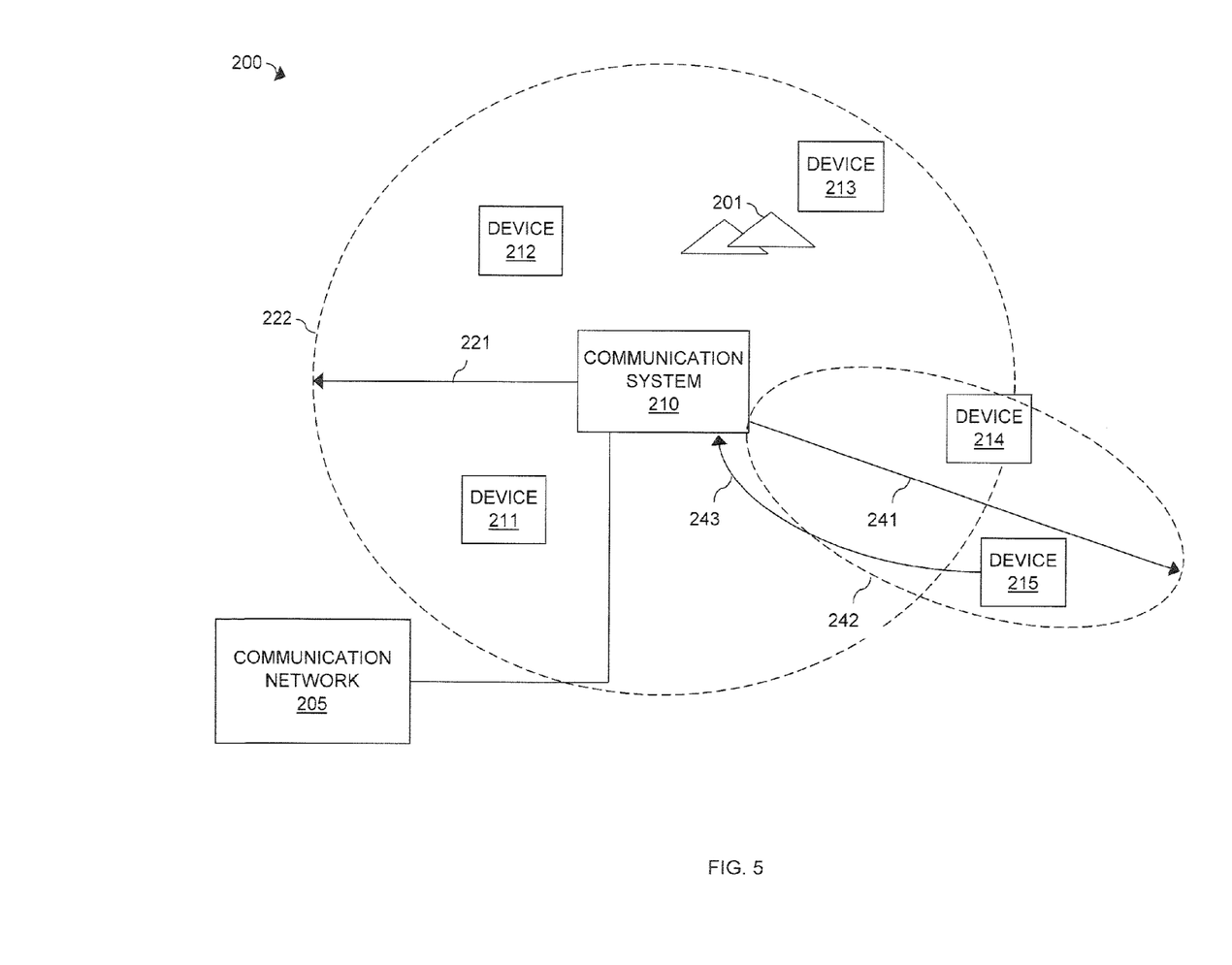
FIG. 5 illustrates a communication network in an embodiment of the invention.

The following describes the operation of communication network 200 with respect to FIGS. 2 and 4-5. Referring to FIG. 2, communication system 210 receives a communication from communication network 205. Communication system 210 encodes a wireless signal 221 with the communication for transmission to multiple wireless devices 211, 212, 213, 214, and 215. The shape 222 of the wireless signal 221 could be such that most of the multiple wireless devices are located within the range or coverage area of the wireless signal. The initial wireless signal 221 could be an omnidirectional signal having a generally spherical shape, although it should be understood that other directions are possible.

Communication system 210 transmits the initial wireless signal 221 encoded with the communication to the multiple devices within the range or coverage area of the shape 222 of the wireless signal 221. In an embodiment, the communication could be a broadcast communication that is broadcast to the various devices. It should be understood that the broadcast communication could be transmitted with or without error correction information.

After transmitting the initial wireless signal 221, communication system 221 monitors for and receives acknowledgement messages 223 and 224 from the various devices 211 and 212 of the multiple devices 211, 212, 213, 214, and 215 that successfully received and decoded the communication. In particular, devices 211 and 212 transmit wireless signals that carry the acknowledgement messages. Devices 211 and 212 responsively transmit the acknowledgments upon successfully decoding the communication carried by the initial wireless signal 221. Device 211 and 212 may then cycle off or otherwise halt monitoring for and processing error correction transmission in order to conserve processing resources.

In this example, it is assumed that devices 213, 214, and 215 did not successfully decode the communication. For example, the initial wireless signal may have been degraded due to a physical obstruction 201, atmospheric interference, other radio frequency interference, or the like.

In response to receiving the acknowledgment messages 223 and 224 from devices 211 and 212, communication system 210 determines that devices 213, 214, and 215 did not successfully receive or decode the communication. Communication system 210 responsively determines the location of devices 213, 214, and 215. Communication system 210 could determine the location of the devices in a variety of ways, such as by use of the global positioning satellite system (GPS), triangulation techniques, or other well known location determination processes.

As illustrated in FIG. 4, after determining the location of device 213, 214, and 215, communication system 210 determines a new shape for a new signal in an attempt to reach the remaining devices 213, 214, and 215. The new shape could have a different power density per degree compared to the initial shape 222 depending upon the degree covered by the new shape. The smaller the degree covered by the new shape 232, the greater the power density. The greater the degree covered by the new shape 232, the less the power density.

Upon determining the new shape 232 for the new wireless signal 231, communication system 210 encodes and transmits the new wireless signal 231 with new error correction information with the intention of reaching devices 213, 214, and 215. This transmission phase could be considered a multi-cast phase. The new error correction information could be standard FEC codes, such as PRO-MPEG CoP3 codes, as well as other proprietary types of FEC codes. Communication system 210 then monitors for acknowledgement messages from devices 213, 214, and 215 indicating that each device successfully received the transmission of the error correction information and was able to decode the initial communication.

It should be understood that, while intending to reach every remaining device 213, 214, and 215 during the multi-cast phase, wireless signal 231 does not encompass a large enough area to reach device 215. Thus, in this example it is assumed that devices 213 and 214 are able to successfully decode the initial communication after the multi-cast phase, while device 215 is not able to decode the communication.

In particular, device 213 processes the error correction information encoded in wireless signal 231 to correct or decode the initial communication. The new error correction information could be in addition to any error correction information that may have been transmitted along with the initial communication. After decoding the communication, device 213 transmits an acknowledgment 233 to communication system 210.

Likewise, device 214 processes the error correction information encoded in wireless signal 231 to correct or decode the initial communication. The new error correction information could be in addition to any error correction information that may have been transmitted along with the initial communication. After decoding the communication, device 214 transmits an acknowledgment 234 to communication system 210.

Having successfully decoded the initial communication, devices 213 and 214 may advantageously cycle off and cease monitoring for further error correction information. In this manner, devices 213 and 214 are able to conserve processing resources.

Upon receiving the acknowledgement messages 233 and 234, communication system 210 determines which device or devices of the initial group of devices has yet to successfully decode the initial communication transmission after both the broadcast and multi-cast phases. In this case, communication system 210 then determines, based on which devices have returned an acknowledgment, that device 215 has yet to decode the communication. In response, communication system 210 enters a uni-cast phase. In the uni-cast phase, communication system 210 determines a new shape for a new wireless signal that will reach device 215. Communication system 210 encodes a new wireless signal 241 with new error correction information and transmits the new wireless signal 241 to device 215. The new wireless signal 241 has a shape 242 so as to reach device 215. As illustrated, it is possible that the new wireless signal 241 could have a shape 242 that overlaps with the location of device 214. Again, the additional error correction information could be standard FEC codes, such as PRO-MPEG CoP3 codes, as well as other proprietary types of error correction information.

Device 215 processes the error correction information to correct or decode the initial communication. Device 215 returns an acknowledgment message 243 to communication system 210 in the event that the initial communication was successfully decoded. It should be understood that device 215 could receive and use either one or both of the error correction information sets transmitted in signals 231 and 241 to decode the initial communication. Device 215 could also utilize the error correction information, if any, included in the initial signal transmission 221.

Figure 6:
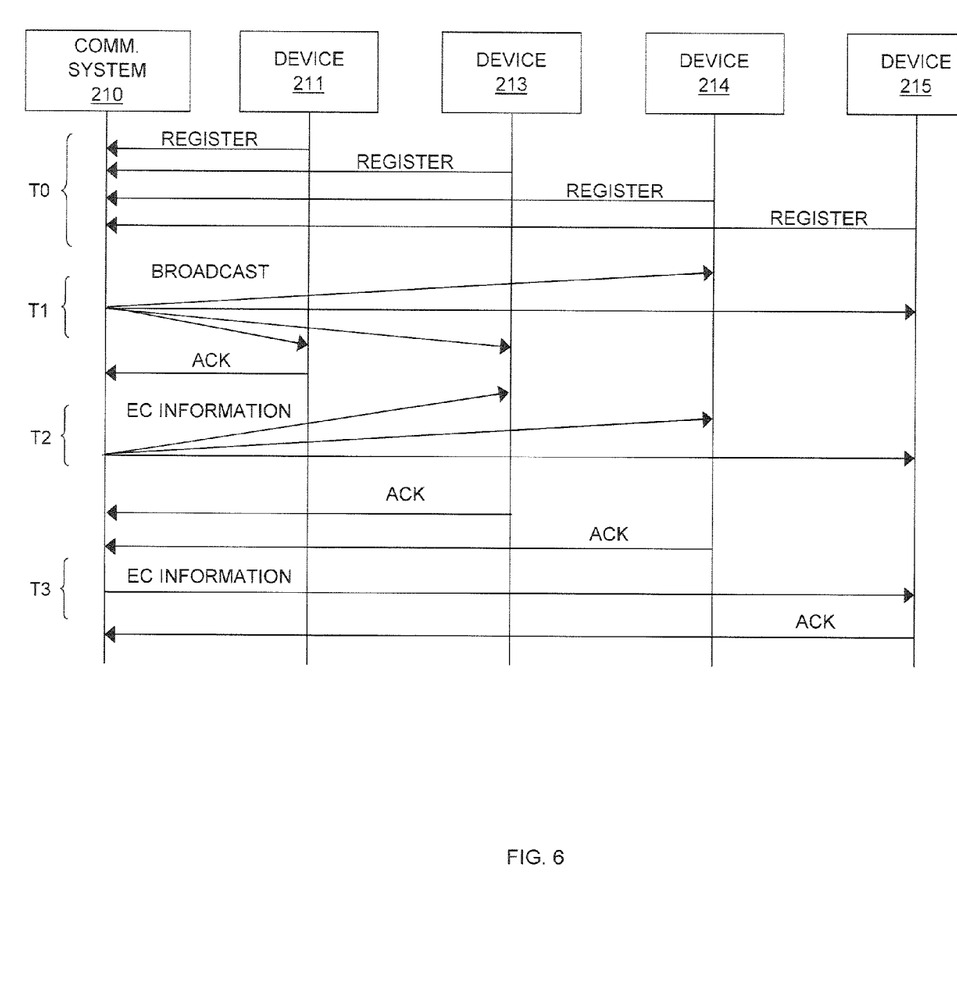
FIG. 6 illustrates a flow diagram in an embodiment of the invention.

FIG. 6 further illustrates the operation of wireless communication network 200 with respect to FIGS. 2 and 4-5. It should be understood that the transmissions illustrated in FIG. 6 could overlap with other transmissions. For instance, more than one broadcast session could occur simultaneously. In addition, the transmission and exchange of broadcast information, acknowledgement messages, and error correction information could overlap.

As shown in FIG. 6, during a first period T0, devices 211, 213, 214, and 215 register with communication system 210. The operation of device 212 is not shown or discussed in FIG. 6 for the sake of clarity. It should be understood that the devices register through wireless channels that are established prior to a broadcast, such as a CDMA, WCDMA, CDMA2000, GSM, WiMax, 1xRTT, or EVDO back channel. Communication system 210 could store the identity of each device in a registration table of active devices registered with communication system 210.

During a second time period T1 after T0, communication system 210 enters a broadcast phase. In the broadcast phase, communication system 210 encodes the initial wireless signal 221 for transmission to devices 211, 213, 214, and 215. The shape 222 of the wireless signal could be such that most of the multiple wireless devices are located within the range or coverage area of the wireless signal. In general, the initial wireless signal could be omni-directional and have a spherical shape.

After encoding the wireless signal 221 with the communication, communication system 210 transmits the initial wireless signal 221 to the multiple devices within the range or coverage area of the shaped signal. After T1, communication system 210 monitors for and receives acknowledgement message 224 from device 211 indicating that device 211 successfully received and decoded the communication.

In this example, it is assumed that devices 213, 214, and 215 did not successfully decode the initial wireless signal 221. For example, the initial wireless signal may have been degraded due to a physical obstruction 201, atmospheric interference, other radio frequency interference, or the like.

Upon receiving the acknowledgment message 224, communication system 210 enters a multi-cast phase. In the multi-cast phase, communication system 210 determines that devices 213, 214, and 215 did not successfully receive or decode the communication by performing a lookup to the registration table. Communication system 210 can compare the device identified in the acknowledgment message 224 to the devices identified in the registration table to determine which devices have yet not returned an acknowledgment message, and therefore which devices have not yet successfully decoded the communication.

Next, communication system 210 determines the location of devices 213, 214, and 215. In some cases, devices 211, 213, 214, and 215 each determine and transmit their location during the registration process. Communication system 210 then stores the location of each device in the registration table. Each device 211, 213, 214, and 215 can also periodically update communication system 210 with their respective locations. Communication system 210 can update the registration table and then later access the registration table to determine the location of each device. It should be understood that many different location determination techniques could be employed by devices 211, 213, 214, and 215 to determine their respective locations, such as GPS, triangulation, or other well known location determination techniques.

During the multi-cast phase and during a third time period T2, communication system 210 determines a new shape for a new signal that will reach at least devices 213 and 214. Communication system 210 then encodes and transmits the new signal 231 having the new shape 232 with error correction information to devices 213 and 214. Devices 213 and 214 process the error correction information to correct or decode the initial communication. Upon decoding the communication, devices 213 and 214 transmit acknowledgments 233 and 234 to communication system 210.

During a fourth time period T3, and after T2, communication system 210 has not received an acknowledgment message from device 215. In response, communication system 210 enters a uni-cast phase. In the uni-cast phase, communication system 210 determines a new shape for a new wireless signal that will reach device 215. Communication system 210 then encodes and transmits the new signal 241 having the new shape 242 with additional error correction information to device 215. Device 214 processes the error correction information to correct or decode the initial communication. Device 215 then responsively returns an acknowledgment message 243 to communication system 210.

In an advantage, communication system 210 progressively transmits error correction information to only those devices that require any or additional error correction information in order to successfully decode a broadcast communication. In this manner, the devices that do not require the error correction information can reduce the use of finite processing resources as they need not receive and process extraneous error correction information. The progressive transmission of error correction information is accomplished by beam forming wireless transmissions by communication system 210 to reach those devices that need the additional error correction information.

Those skilled in the art will appreciate variations from these embodiments that fall within the scope of the invention. Those skilled in the art will appreciate that the features described above can be combined in various ways to form multiple embodiments of the invention. As a result, the invention is not limited to the specific embodiments described above, but only by the claims and their equivalents.

The invention claimed is:

1. A method of operating a communication system to communicate with a plurality of wireless devices, the method comprising:
   determining a first shape for a first wireless signal to reach the plurality of wireless devices;
   transmitting the first wireless signal encoded with a first communication to the plurality of wireless devices;
   receiving an acknowledgment from a first device of the plurality of wireless devices indicating that the first device received and decoded the first communication;
   determining a second shape for a second wireless signal to reach a second device of the plurality of wireless devices; and
   transmitting the second wireless signal encoded with first error correction information for the first communication to the second device of the plurality of wireless devices.

2. The method of claim 1 wherein the first error correction information is used by the second device of the plurality of wireless devices to decode the first communication.

3. The method of claim 1 further comprising transmitting the first wireless signal encoded with the first communication and second error correction information to the plurality of wireless devices.

4. The method of claim 3 wherein the first error correction information and the second error correction information are used by the second device of the plurality of devices to decode the first communication.

5. The method of claim 1 wherein the first shape is different than the second shape.

6. The method of claim 1 wherein the first communication comprises a broadcast communication.

7. The method of claim 1 wherein the first error correction information comprises packet level error correction information.

8. The method of claim 1 wherein the first error correction information comprises a PRO-MPEG CoP3 forward error correction code.

9. A communication system comprising:
   a transceiver system configured to transmit a first wireless signal encoded with a first communication and having a first shape to a plurality of wireless devices and receive a first acknowledgment message transmitted from a first device of the plurality of wireless devices indicating that the first device of the plurality of wireless devices successfully decoded the first communication; and
   a processing system coupled to the transceiver system and configured to determine a second device of the plurality of wireless devices that did not transmit the first acknowledgment message, determine a location of the second device of the plurality of wireless devices, and determine a second shape for a second wireless signal that will reach the location of the second device of the plurality of wireless devices; and
   the transceiver system further configured to transmit to the second device of the plurality of wireless devices the second wireless signal encoded with first error correction information for decoding the first communication.

10. The communication system of claim 9 wherein the first error correction information is used by the second device of the plurality of wireless devices to decode the first communication.

11. The communication system of claim 9 wherein the transceiver system transmits the first wireless signal encoded with the first communication and second error correction information to the plurality of wireless devices.

12. The communication system of claim 11 wherein the first error correction information and the second error correction information are used by the second device of the plurality of devices to decode the first communication.

13. The communication system of claim 9 wherein the first communication comprises a broadcast communication.

14. The communication system of claim 9 wherein the first error correction information comprises packet level error correction information.

15. The communication system of claim 9 wherein the first error correction information comprises a PRO-MPEG CoP3 forward error correction code.

16. The communication system of claim 9 wherein the first shape is different than the second shape.

* * * * *